United States Patent
Loh

(10) Patent No.: US 12,353,338 B2
(45) Date of Patent: Jul. 8, 2025

(54) LOCALITY-BASED DATA PROCESSING

(71) Applicant: Advanced Micro Devices, Inc., Santa Clara, CA (US)

(72) Inventor: Gabriel H. Loh, Bellevue, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 18/216,098

(22) Filed: Jun. 29, 2023

(65) Prior Publication Data

US 2024/0078197 A1    Mar. 7, 2024

Related U.S. Application Data

(60) Provisional application No. 63/403,121, filed on Sep. 1, 2022.

(51) Int. Cl.
G06F 13/16    (2006.01)

(52) U.S. Cl.
CPC ...... *G06F 13/1668* (2013.01); *G06F 13/1642* (2013.01)

(58) Field of Classification Search
CPC .......................... G06F 13/1668; G06F 13/1642
See application file for complete search history.

(56) References Cited

U.S. PATENT DOCUMENTS

| | | | |
|---|---|---|---|
| 7,062,610 B2 | 6/2006 | Conway | |
| 7,155,572 B2* | 12/2006 | Hughes | G06F 12/0835 710/27 |
| 2003/0163649 A1* | 8/2003 | Kapur | G06F 12/0862 711/146 |
| 2012/0198441 A1 | 8/2012 | Mahdavi et al. | |
| 2013/0314888 A1 | 11/2013 | Chall et al. | |
| 2015/0286525 A1* | 10/2015 | Singh | G06F 11/165 714/768 |
| 2018/0089116 A1* | 3/2018 | Park | G06F 13/28 |
| 2020/0401519 A1 | 12/2020 | Kalyanasundharam et al. | |
| 2022/0413586 A1 | 12/2022 | Tsien et al. | |

FOREIGN PATENT DOCUMENTS

WO    2019-083859 A1    5/2019

OTHER PUBLICATIONS

International Search Report and Written Opinion for International Application No. PCT/US2023/031398, mailed Dec. 5, 2023, 9 pages.
"Multi-layer AHB Overview"; ARM DVI 0045B; ARM Limited, North American Headquarters, 120 Rose Orchard Way, San Jose, CA 95134; Rev. 2004; 8 pages.
John Hennessy, Mark Heinrich and Anoop Gupta; "Cache-Coherent Distributed Shared Memory: Perspectives on Its Development and Future Challenges"; invited paper; Proceedings of the IEEE, vol. 87, No. 3, Mar. 1999; 12 pages.
"Hybrid Memory Cube Specification 2.1"; Hybrid Memory Cube Consortium; Hybrid Memory Cube with HMC-30G-VSR PHY; Rev 2.0; Nov. 2014; 132 pages.

* cited by examiner

*Primary Examiner* — Eric Cardwell
(74) *Attorney, Agent, or Firm* — Polansky & Associates, P.L.L.C.; Paul J. Polansky

(57) ABSTRACT

A data processing node includes a processor element and a data fabric circuit. The data fabric circuit is coupled to the processor element and to a local memory element and includes a crossbar switch. The data fabric circuit is operable to bypass the crossbar switch for memory access requests between the processor element and the local memory element.

19 Claims, 4 Drawing Sheets

LOCALITY-BASED DATA PROCESSING

This application claims priority to U.S. Provisional Patent Application 63/403,121, filed Sep. 1, 2022, the entire contents of which are incorporated by reference herein.

BACKGROUND

This disclosure relates generally to data processing systems, and more specifically to data processing systems with non-uniform memory access (NUMA) architectures. Many three-dimensional (3D) stacked memories provide multiple independent memory channels in a spatially arrayed fashion. When stacked on top of a multi-core processor, some cores will be closer to some channels and farther from other channels, leading to differences in memory access latencies.

Current core and cache hierarchies are not particularly optimized for such disparate memory access latencies, and instead use unified structures (e.g., queues) that typically do not distinguish between local and more remote memory requests. This disparity can lead to reduced performance, e.g., longer latencies, for those requests that target a local memory channel as they may need to wait for other requests (e.g., requests sent as remote requests from other CPUs) to be serviced.

Figure 1:
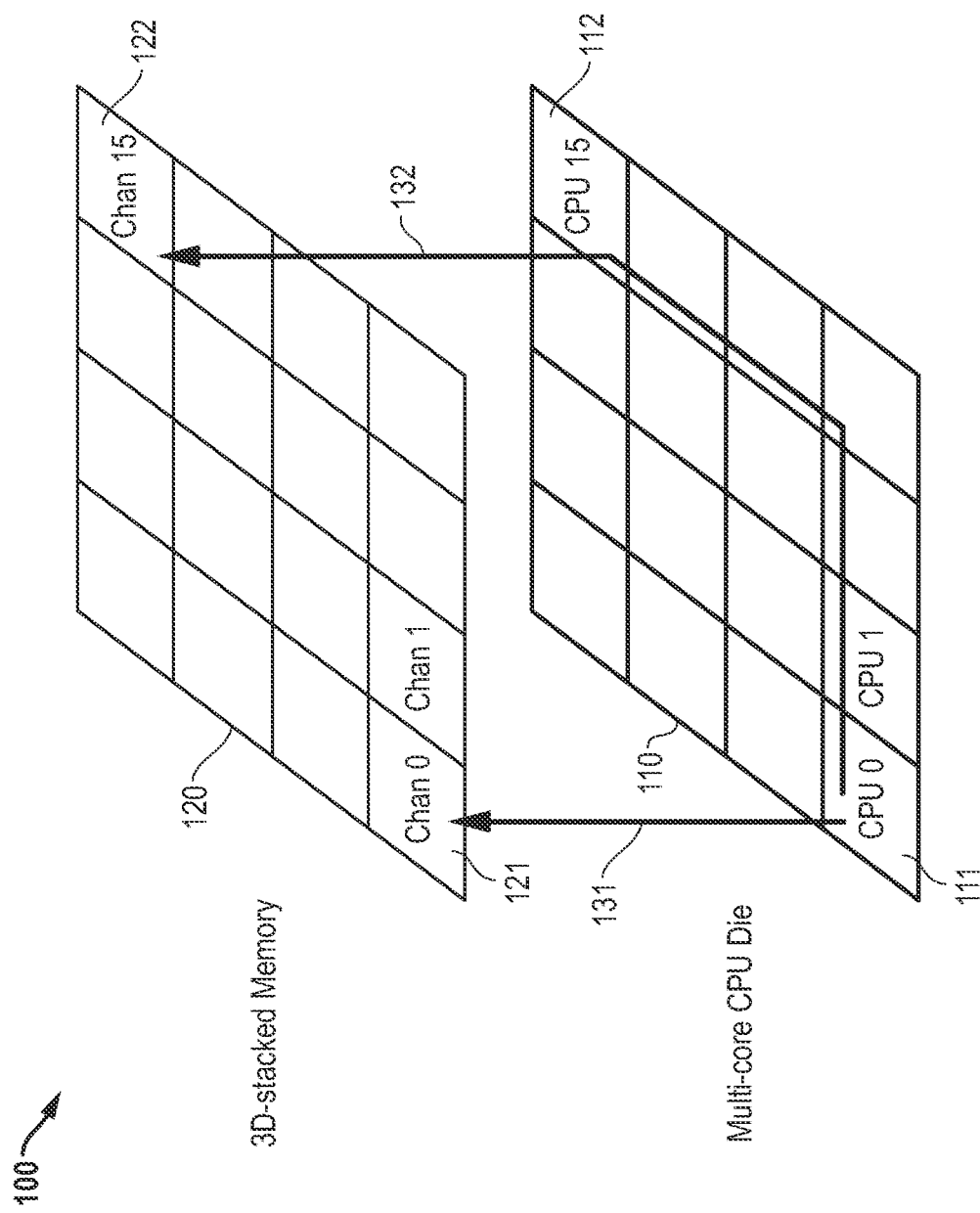
FIG. 1 illustrates in block diagram form a data processing system using stacked memory that uses a locality-optimized core to memory interface according to some implementations.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION OF ILLUSTRATIVE IMPLEMENTATIONS

A data processing node includes a processor element and a data fabric circuit. The data fabric circuit is coupled to the processor element and to a local memory element and includes a crossbar switch. The data fabric circuit is operable to bypass the crossbar switch for memory access requests between the processor element and the local memory element.

A data processing system includes a plurality of processor nodes and a plurality of memory elements. Each of the plurality of processor nodes includes a processor element and a data fabric circuit. The data fabric circuit has a first port coupled to the processor element, a second port operable to be coupled to an interface circuit of at least one other data processing node, and a third port for coupling to a local memory element. The plurality of memory elements includes the local memory element. The data fabric circuit is operable to route memory access requests between the processor element, the second port, and the third port using a crossbar switch, and to bypass the crossbar switch for memory access requests between the processor element and a local memory element.

A method for use in a data processing system includes processing data using a first data processing node, including generating a first memory access request to a local memory element adjacent to the first data processing node. A second memory access request to the local memory element is received from a second data processing node. The first and second memory access requests are routed to a memory controller coupled to the local memory element, wherein routing the second memory access request to the memory controller comprises using a crossbar switch, and routing the first memory access request to the local memory element comprises bypassing the crossbar switch.

FIG. 1 illustrates in block diagram form a data processing system 100 using stacked memory that uses a locality-optimized core to memory interface according to some implementations. Data processing system 100 is physically and electrically organized into a multi-core central processing unit die 110, and a three-dimensional stacked memory 120. Multi-core central processing unit die 110 includes a two-dimensional, planar array of processor cores combined on a single semiconductor die. A processor core 111 labelled "CPU 0" is located in a bottom left position as multi-core central processing unit die 110 is oriented in FIG. 1. A second core labelled "CPU 1" is located adjacent to and to the right of processor core 111. This pattern repeats throughout multi-core central processing unit die 110 until a last core 112 labelled "CPU 15" is located in the back right corner of multi-core central processing unit die 110.

Three-dimensional stacked memory 120 generally includes one or more planar arrays of memory elements in which memory elements in the same position of each planar array is part of a corresponding memory channel. A memory channel 121 labelled "CHAN 0" is located in a bottom left position as three-dimensional stacked memory 120 is oriented in FIG. 1. A memory channel labelled "CHAN 1" is located adjacent and the right of memory channel 121. This pattern repeats throughout three-dimensional stacked memory 120 until a memory channel 122 labelled "CHAN 15" is located in a back right position as three-dimensional stacked memory 120 is oriented in FIG. 1.

In some implementations, three-dimensional stacked memory 120 is implemented using separate integrated circuit dice that may be formed, for example, as one or more planar arrays of stacked memory dice. In some implementations, each memory channel is formed as a set of integrated circuit dice which are vertically connected using through-silicon vias (TSVs). For example, stacked memories such as the Hybrid Memory Cube provide multiple independent memory channels in a spatially arrayed fashion and is suitable as three-dimensional stacked memory 120.

When three-dimensional stacked memory 120 is stacked on top of multi-core central processing unit die 110, some cores will be closer to some channels (e.g., CPU 0 is closer to CHAN 0) and farther from other channels (e.g., CPU 0 is far from CHAN 15), leading to differences in memory access latencies. This non-uniform memory access time can provide poor performance if the CPU cores frequently accesses remote data. For example, if CPU 0 accesses memory in CHAN 0, it can use vertical interconnects that can be implemented, for example, using TSVs. Since three-dimensional stacked memory 120 can be stacked vertically close to multi-core central processing unit die 110, the memory access signal propagation times can be very short. Conversely, a memory access request from since CPU 0 to CHAN 15 memory has to be routed and buffered many times across a long distance before the memory access request arrives at CHAN 15 memory and signal propagation times can be long.

The inventor of the present application has discovered that performance of data processing system 100 can be improved by routing an access from a CPU to its vertically adjacent memory channel more quickly and directly compared to requests from remote CPUs to the adjacent memory channel, and vice versa. Since CPUs spend most of their time accessing local workloads, but less frequently accessing remote workloads, such a routing will on average improve the overall performance of data processing system 100.

Figure 2:
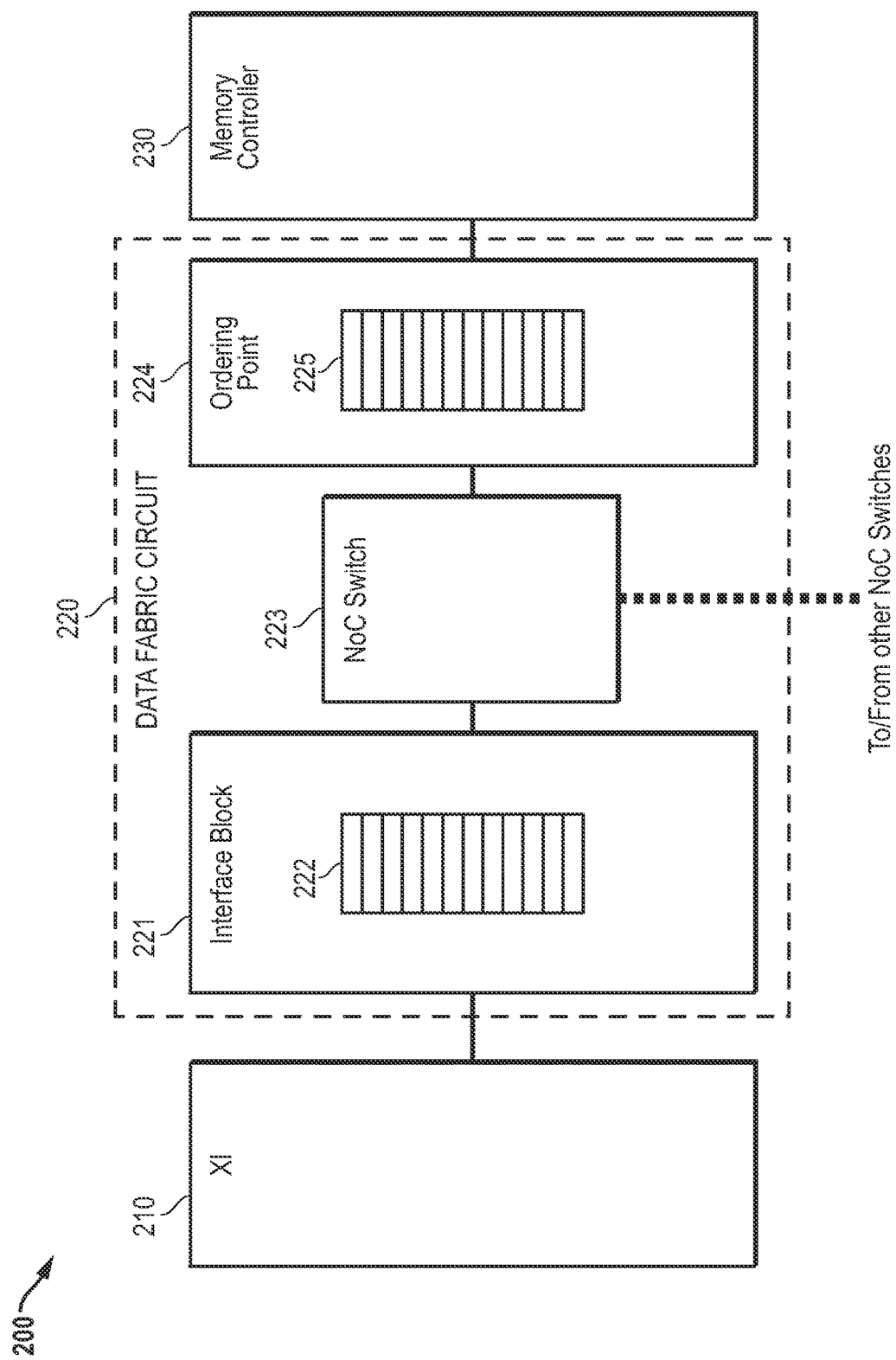
FIG. 2 illustrates in block diagram form a portion of a data processing node according to the prior art.

FIG. 2 illustrates in block diagram form a portion of a data processing node 200 according to the prior art. Data processing node 200 includes a crossbar interface circuit 210 labelled "XI", a data fabric circuit 220, and a memory controller 230.

Crossbar interface circuit 210 is an interface from a CPU core or a CPU core complex to a crossbar switch. In a typical implementation of a multi-core complex, each individual CPU core has a dedicated cache or set of caches, followed by a shared last-level cache (LLC) that can maintain coherency among data elements in the multi-core complex. In this example, the crossbar interface circuit 210 is an interface from the shared LLC, and will generate a large number of cache line fetches, writebacks, and non-cacheable reads and writes, but will also occasionally generate remote traffic including data shared between program threads, sempahores, and the like.

Data fabric circuit 220 includes generally an interface block 221, a network-on-chip switch 223 labelled "NoC SWITCH", and an ordering point circuit 224. Interface block 221 has a buffer 222 for storing accesses, since the accesses could arrive, temporarily, at a faster rate than they can be serviced. Interface block 221 is bidirectionally connected to network-on-chip switch 223. Network-on-chip switch 223 is connected to other network-on-chip switches associated with and adjacent to other CPU cores or core complexes. It can be implemented as a large crossbar switch and allows switching of memory access requests and memory access responses between any CPU core and any memory controller and local memory. After leaving the crossbar switch a memory access request passes through to a primary memory ordering point 224 before finally arriving at the memory controller associated with the address of the memory access request.

Memory controller 230 is bidirectionally connected to primary memory ordering point 224 and receives memory access requests, i.e., read or write requests, and provides them to an attached memory such as CHAN 0 memory. Memory controller 230 stores accesses in a memory queue, and selectively re-orders them to achieve various goals such as efficiency of the memory bus. For example, it generally prefers accesses to open pages, but occasionally switches to accesses to closed pages to reduce latency and improve access fairness.

From this discussion, it should be apparent that the farther the memory access request must traverse the array of processor cores, the longer the latency. In particular, data processing node 200 can cause a memory access request to the local memory attached to data processing node 200 to be delayed significantly by traffic from remote nodes to the attached memory.

Figure 3:
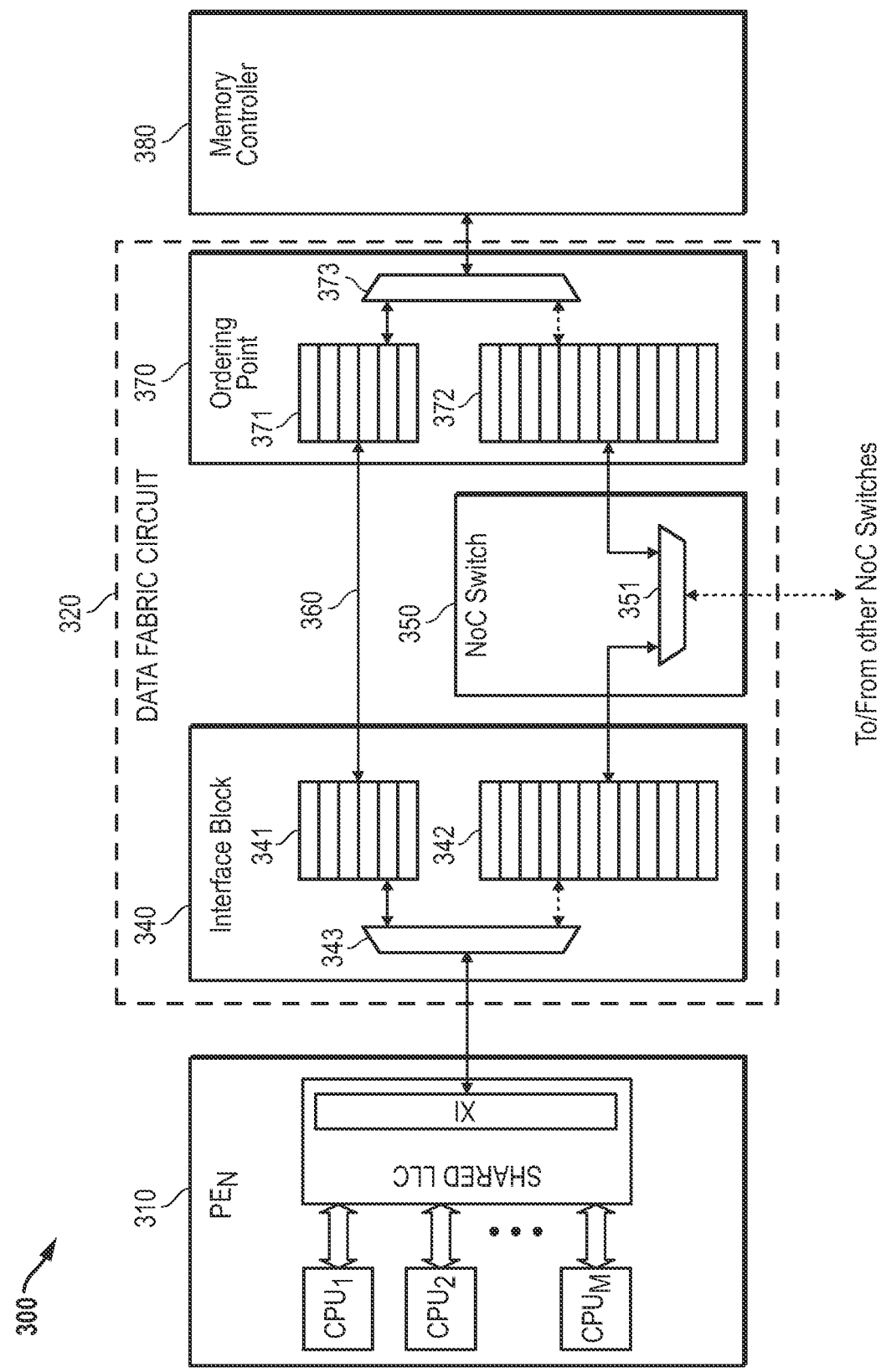
FIG. 3 illustrates in block diagram form a portion of a locality-based data processing system according to some implementations.

FIG. 3 illustrates in block diagram form a portion of a data processing node 300 according to some implementations. Data processing node 300 includes generally a processor element 310 labelled "PEN", a data fabric circuit 320, and a memory controller 380.

Processor element 310 includes generally a set of M CPU cores labelled "$CPU_1$" to "$CPU_M$". Each CPU core has its internal cache hierarchy, but the CPU cores share a last-level cache (LLC) that also allows data in the upper level caches to be kept coherent. The shared LLC includes a crossbar interface circuit like crossbar interface circuit 210 of FIG. 2.

Data fabric circuit 320 includes generally an interface circuit 340, a network-on-chip crossbar switch circuit 350, a bus 360, and an ordering point circuit 370. Interface circuit 340 includes a queue 341, a queue 342, and a multiplexer/de-multiplexer 343. Multiplexer/de-multiplexer 343 has a bidirectional upstream (toward the processor element) port, and two bidirectional downstream (toward the memory) ports. For memory access requests and write data, the address of the memory access requests causes multiplexer/de-multiplexer 343 to select either its first output (for local memory access requests) or its second output (for remote memory access requests). Queue 341 operates to store and buffer memory access requests that will be forwarded to ordering point circuit 370 and store and buffer responses that will be forwarded to processor element 310, while queue 342 operates to store and buffer memory access requests that will be forwarded to the network on chip of which network-on-chip crossbar switch circuit 350 is a part, and store and buffer responses that will be forwarded to processor element 310. For memory access requests, responses, and read data, multiplexer/de-multiplexer 343 selects the output of one of queue 341 and queue 342 to provide to crossbar interface 311 in processor element 310.

Network-on-chip crossbar switch circuit 350 includes a multiplexer/de-multiplexer 351. Multiplexer/de-multiplexer 351 has three bidirectional ports, including a first port connected to queue 342, a second port connected to a buffer 372, and a third port connected to other network-on-chip switches. Network-on-chip crossbar switch circuit 350 connects the first port and the third port of multiplexer/de-multiplexer 351 for memory access requests and write data from processor element 310 to remote memory, and memory access responses and read data from the remote memory. Network-on-chip crossbar switch circuit 350 connects the second port and the third port of multiplexer/de-multiplexer 351 for memory access requests and write data from a remote processor element to local memory, and memory access responses and read data from the local memory.

Ordering point circuit 370 includes a buffer 371, a buffer 372, and a multiplexer/de-multiplexer 373. Buffer 371 is connected to queue 341 and to a first port of multiplexer/de-multiplexer 373. Buffer 372 is connected to the second power of multiplexer/de-multiplexer 351 and to a second port of multiplexer/de-multiplexer 373. Ordering point circuit 370 allows the memory requests and responses to be re-ordered to ensure coherence with other processing nodes that may have a local copy, and unlike queues 341 and 342, does not necessarily convey accesses in the order it receives them.

According to the disclosed implementations, the requests destined for the local memory channel are provided a direct bypass using bus 360 to ordering point circuit 370. The direct bypass allows memory access requests and responses to be acted upon significantly faster than those requests and responses that go through the NoC switch fabric and to enqueue and dequeue through queues in the NoC switch. In this way, ordering point circuit 370 is operable to select accesses from buffer 371 in preference to accesses from buffer 372.

As shown pictorially in FIG. 3, the sizes of the buffers for local memory access requests can be different from the sizes of the buffers for remote memory access requests. In this example, queue 341 is shown as being smaller than queue 342, and buffer 371 is shown as being smaller than buffer 372. To save on area and power or to improve timing, the number of local request buffers can be less than the number of remote buffers, since the required buffer size is a function of the expected memory latency. Therefore, since the local memory access requests have shorter latencies, the corresponding number of buffers for local memory requests can be smaller. Alternatively, optimization for the expected common case in which cores almost exclusively access their local memory channels implies that there should be relatively little traffic from other (remote) cores, and so the number of buffers supporting remote requests could potentially also be reduced, or they can maintain larger numbers but utilize less aggressive timing loops (e.g., multi-cycle picker/arbitration) to enable the overall implementation to achieve higher clock speeds and/or further reduce power.

While FIG. 3 shows ordering point circuit 370 forwarding requests to memory controller 380, it can perform other functions such as ensuring cache coherence by performing lookups in coherence directories (e.g., probe filters) to determine if any other cores in the system have a copy of the requested data. Ordering point circuit 370 can similarly prioritize local requests to perform coherence directory lookups for these local requests first or preferentially before any non-local requests.

While in the implementations described above memory requests were steered into different paths based on whether they were local traffic or remote traffic, in other implementations the classes of traffic could be different from each other in another way, with local/remote being just one possible classification. Other classifications could include low-priority vs. high-priority (perhaps based on thread IDs or other information), speculative vs. non-speculative memory requests (e.g., those from prefetchers, those from loads behind low-confidence branches), etc.

Figure 4:
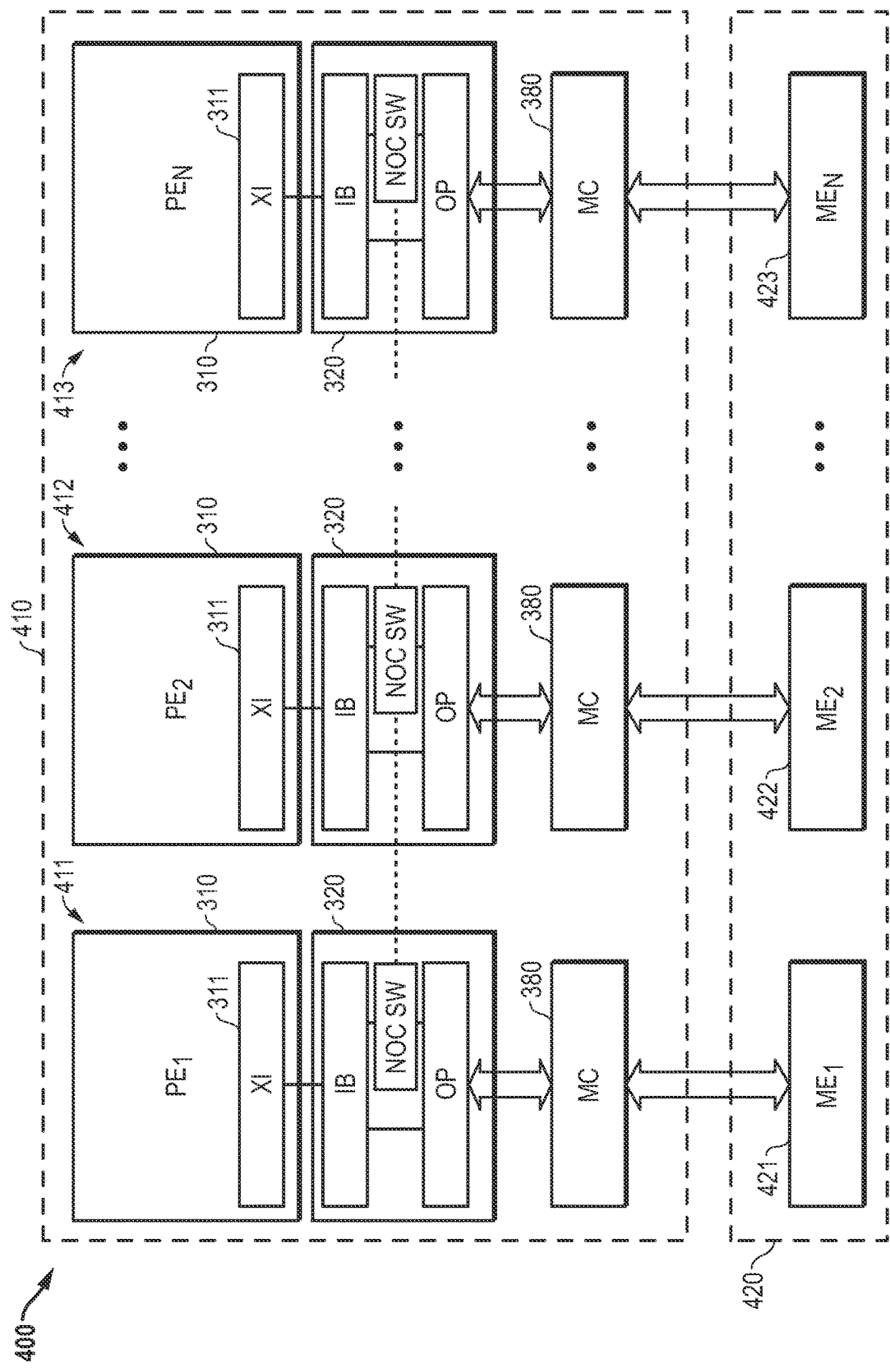
FIG. 4 illustrates in block diagram form a locality-based data processing system according to some implementations.

FIG. 4 illustrates in block diagram form a locality-based data processing system 400 according to some implementations. Locality-based data processing system 400 includes a set of data processing nodes 410 and a set of memory elements 420. Shown in FIG. 4 is a representative set of data processing nodes 411, 412, and 413 and a corresponding representative set of local memory elements 421, 422, and 423. Locality-based data processing system 400 is useful in understanding that the network-on-chip switch is distributed and formed by network-on-chip switch circuits in each processing node, whereas the direct bypass path for local accesses is individualized for each processing node. Because of the physical distribution of the cores in the processor array, it should be apparent that if data processing node 411 accesses memory attached to data processing node 413, i.e., local memory element 423, the memory access would intrinsically include a large delay as the access "hops" around the array.

While particular implementations have been described, various modifications to these implementations will be apparent to those skilled in the art. For example, the numbers of buffers used for local accesses and remote accesses can be varied based upon the system and/or application environment. The processor nodes can include a single processor core, or a set of processor cores. The size and number of levels of the cache hierarchy in each processor element can vary in different implementations. The function of the processor cores can also vary in different implementations and can be, for example, central processing unit (CPU) cores, graphics processing unit (GPU) cores, digital signal processor (DSP) cores, neural processor cores, and the like. The memory types may vary in different implementations and can include, for example, double data rate (DDR) memory, high-bandwidth memory (HBM), and the like, as well as other types of memory.

Accordingly, it is intended by the appended claims to cover all modifications of the disclosed implementations that fall within the scope of the disclosed implementations.

What is claimed is:

1. A data processing node, comprising:
   a local processor element;
   a local memory controller configured to couple to a local memory element; and
   a local data fabric circuit coupled to the local processor element and to the local memory element and including:
   a local crossbar switch circuit coupled to the local processor element and the local memory controller and configured to be coupled to one or more remote crossbar switch circuits each coupled to a corresponding remote processor element and to a remote memory controller to form a crossbar switch; and
   a local bus,
   wherein the local data fabric circuit is operable to use the local bus to bypass the crossbar switch for memory access requests between the local processor element and the local memory element.

2. The data processing node of claim 1, wherein:
   the local data fabric circuit further has a first port coupled to the local processor element, a second port operable to be coupled to at least one other data processing node through the crossbar switch, and a third port coupled to the local memory element, wherein the local data fabric circuit is operable to route memory access requests between first port and the second port using the local crossbar switch circuit, and the second port and the third port using the crossbar switch.

3. The data processing node of claim 2, wherein:
   the local memory controller is operable to provide memory access requests received from the third port of the local data fabric circuit to the local memory element, and to provide memory access responses from the local memory element to the third port of the local data fabric circuit,
   wherein the local memory controller is adapted to be coupled to a dynamic random access memory and is further operable to provide memory access requests received from the third port of the local data fabric circuit to the local memory element by selectively re-ordering the memory access requests.

4. The data processing node of claim 1, wherein the local data fabric circuit comprises:
   an interface circuit comprising a first queue for storing local accesses and coupled to a first port of the interface circuit, and a second queue for storing remote accesses and coupled to a second port of the interface circuit; and an ordering point circuit having a first buffer coupled to the first queue of the interface circuit, and a second buffer, the ordering point circuit operable to transmit memory access requests and coherency requests to a second port from said first buffer and the second buffer, wherein:

the crossbar switch is further operable to switch accesses between said second port of the interface circuit and said second port of said ordering point circuit, and the second buffer of the ordering point circuit; and the first queue of the interface circuit is directly coupled to the first buffer of the ordering point circuit.

5. The data processing node of claim 4, wherein the ordering point circuit is operable to select accesses from the first buffer in preference to accesses from the second buffer.

6. The data processing node of claim 1, wherein the local processor element comprises one of a core and a core complex.

7. The data processing node of claim 6, wherein the core complex includes a plurality of cores and a last level cache shared between the plurality of cores.

8. A data processing system, comprising:
a plurality of processor nodes, each comprising:
   a local processor element;
   a local memory controller configured to couple to a local memory element; and
   a local data fabric circuit having a first port coupled to the local processor element, a second port operable to be coupled to an interface circuit of at least one other data processing node, and a third port for coupling to the local memory element, and
a plurality of memory elements including the local memory element of each of the plurality of processor nodes,
wherein the local data fabric circuit is operable to route memory access requests between the local processor element, the second port, and the third port using a crossbar switch formed by the local data fabric circuits of each of the plurality of processor nodes, and to bypass the crossbar switch for memory access requests between the local processor element and the local memory element using a local bus.

9. The data processing system of claim 8, wherein:
the plurality of processor nodes is formed in a processor array in a first plane; and
the plurality of memory elements is formed in a memory array in a second plane substantially parallel to the first plane.

10. The data processing system of claim 9, wherein:
the plurality of processor nodes is formed on a single integrated circuit die; and
each of the plurality of memory elements is formed on respective integrated circuit dice.

11. The data processing system of claim 9, wherein:
each local memory element substantially overlies and is electrically coupled to a corresponding local processor element.

12. The data processing system of claim 9, wherein each of the plurality of processor nodes further comprises:
a memory controller that is operable to provide memory access requests received from the third port of the local data fabric circuit to the local memory element, and to provide memory access responses from the local memory element to the third port of the local data fabric circuit.

13. The data processing system of claim 12, wherein:
the local memory controller is adapted to be coupled to a dynamic random access memory and is further operable to provide memory access requests received from the third port of the local data fabric circuit to the local memory element by selectively re-ordering the memory access requests.

14. The data processing system of claim 12, wherein: the local data fabric circuit comprises:
an interface circuit coupled to the local processor element and comprising a first queue for storing local accesses and coupled to a first port and a second queue for storing remote accesses coupled to a second port;
an ordering point circuit having a first buffer coupled to the first queue of the interface circuit, and a second buffer, the ordering point circuit operable to transmit memory access requests and coherency requests to a second port from said first buffer and said second buffer, wherein:
the crossbar switch is further operable to switch accesses between said second port of the interface circuit and said second port of said ordering point circuit, and the second buffer of the ordering point circuit; and
the first queue of the interface circuit is directly coupled to the first buffer of the ordering point circuit.

15. The data processing system of claim 14, wherein the ordering point circuit is operable to select accesses from the first queue thereof in preference to accesses from the second queue thereof.

16. The data processing system of claim 8, wherein the local processor element comprises one of a core and a core complex.

17. The data processing system of claim 16, wherein the local processor element comprises a core complex that includes a plurality of cores and a last level cache shared between the plurality of cores.

18. A method for use in a data processing system comprising:
processing data using a first data processing node, including generating a first memory access request to a local memory element adjacent to the first data processing node;
receiving a second memory access request to the local memory element from a second data processing node; and
routing the first and second memory access requests to a memory controller coupled to the local memory element, wherein routing the second memory access request to the memory controller comprises using a crossbar switch, and routing the first memory access request to the local memory element comprises bypassing the crossbar switch, wherein the routing comprises:
receiving the first memory access request directly by a first buffer;
receiving the second memory access request by a second buffer through the crossbar switch; and
selecting the first memory access request at an output of the first buffer preferentially to the second memory access request at an output of the second buffer and providing a selected memory access request to the memory controller.

19. The method of claim 18, wherein:
generating the first memory access request to the local memory element comprises providing the first memory access request to a vertically adjacent first memory element.

* * * * *